US012358288B2

(12) United States Patent
Hirai

(10) Patent No.: US 12,358,288 B2
(45) Date of Patent: Jul. 15, 2025

(54) LIQUID EJECTION DEVICE AND CONTROL METHOD FOR LIQUID EJECTION DEVICE

(71) Applicant: SEIKO EPSON CORPORATION, Tokyo (JP)

(72) Inventor: Yasuaki Hirai, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 172 days.

(21) Appl. No.: 18/151,659

(22) Filed: Jan. 9, 2023

(65) Prior Publication Data

US 2023/0219344 A1 Jul. 13, 2023

(30) Foreign Application Priority Data

Jan. 12, 2022 (JP) ................................ 2022-003157

(51) Int. Cl.
*B41J 2/165* (2006.01)

(52) U.S. Cl.
CPC ....... *B41J 2/16526* (2013.01); *B41J 2/16517* (2013.01); *B41J 2/16579* (2013.01); *B41J 2002/1657* (2013.01); *B41J 2002/16573* (2013.01)

(58) Field of Classification Search
CPC ................ B41J 2/16526; B41J 2/16517; B41J 2/16579; B41J 2002/1657; B41J 2002/16573
See application file for complete search history.

(56) References Cited

U.S. PATENT DOCUMENTS

2019/0227470 A1* 7/2019 Nakano .............. G03G 15/5058

FOREIGN PATENT DOCUMENTS

| | | | | | |
|---|---|---|---|---|---|
| JP | 2001232816 | A | * | 8/2001 | .......... B41J 2/16532 |
| JP | 2009090533 | A | * | 4/2009 | ............ A61K 35/74 |
| JP | 2011-056754 | A | | 3/2011 | |
| JP | 2012-053739 | A | | 3/2012 | |
| JP | 2012-106394 | A | | 6/2012 | |
| JP | 2018-083310 | A | | 5/2018 | |

* cited by examiner

*Primary Examiner* — Yaovi M Ameh
(74) *Attorney, Agent, or Firm* — WORKMAN NYDEGGER

(57) ABSTRACT

A liquid ejection device includes a liquid ejection unit configured to perform printing by ejecting a liquid from a nozzle onto a medium, a maintenance unit configured to perform maintenance of the liquid ejection unit, a determination unit configured to determine whether printing data for the printing is ruled-line data including a vertical ruled line or non-ruled-line data not including the vertical ruled line, a storage unit configured to store a determination result obtained by the determination unit, and a control unit. The control unit changes intensity of the maintenance in accordance with a frequency of the ruled-line data included in the determination result stored in the storage unit.

5 Claims, 4 Drawing Sheets

LIQUID EJECTION DEVICE AND CONTROL METHOD FOR LIQUID EJECTION DEVICE

The present application is based on, and claims priority from JP Application Serial Number 2022-003157, filed Jan. 12, 2022, the disclosure of which is hereby incorporated by reference herein in its entirety.

BACKGROUND

1. Technical Field

The present disclosure relates to a liquid ejection device and a control method for a liquid ejection device.

2. Related Art

For example, as disclosed in JP-A-2012-106394, there is a printer being an example of a liquid ejection device that performs printing on a medium by ejecting liquid droplets from nozzle openings provided in a recording head being an example of a liquid ejection unit. The liquid is exposed to air at the nozzle opening. Therefore, the solvent component of the liquid in the vicinity of the nozzle opening is easily evaporated. When the solvent component is evaporated and the viscosity of the liquid increases, a landing position of the liquid on the medium is shifted. In particular, in a case in which a ruled line along a transport direction is printed while moving the recording head in a main scanning direction, when the landing positions of the droplets are shifted, the ruled line is printed in a shifted manner.

The viscosity of the liquid can appropriately be maintained by performing flushing in which droplets are forcibly ejected. However, since a large amount of liquid is consumed, in the printer described in JP-A-2012-106394, the amount of liquid consumed is reduced by reducing the amount of liquid ejected from some nozzle openings according to a recording mode.

In the printer described in JP-A-2012-106394, the ejection amount by flushing is only partially changed. Therefore, reduction of the consumption amount of liquid is limited.

SUMMARY

In order to solve the above-mentioned problem, provided is a liquid ejection device including a liquid ejection unit configured to perform printing by ejecting a liquid from a nozzle onto a medium, a maintenance unit configured to perform maintenance of the liquid ejection unit, a determination unit configured to determine whether a printing mode for the printing is a ruled-line mode including a vertical ruled line or a non-ruled-line mode not including the vertical ruled line, a storage unit configured to store a determination result obtained by the determination unit, and a control unit. The control unit changes intensity of the maintenance in accordance with a frequency of the ruled-line mode included in the determination result stored in the storage unit.

In order to solve the above-mentioned problem, provided is a control method for a liquid ejection device including a liquid ejection unit configured to perform printing by ejecting a liquid from a nozzle onto a medium, a maintenance unit configured to perform maintenance of the liquid ejection unit, a determination unit configured to determine whether a printing mode for the printing is a ruled-line mode including a vertical ruled line or a non-ruled-line mode not including the vertical ruled line, and a storage unit configured to store a determination result obtained by the determination unit. intensity of the maintenance is changed in accordance with a frequency of the ruled-line mode included in the determination result stored in the storage unit.

DESCRIPTION OF EXEMPLARY EMBODIMENTS

First Exemplary Embodiment

Figure 1:
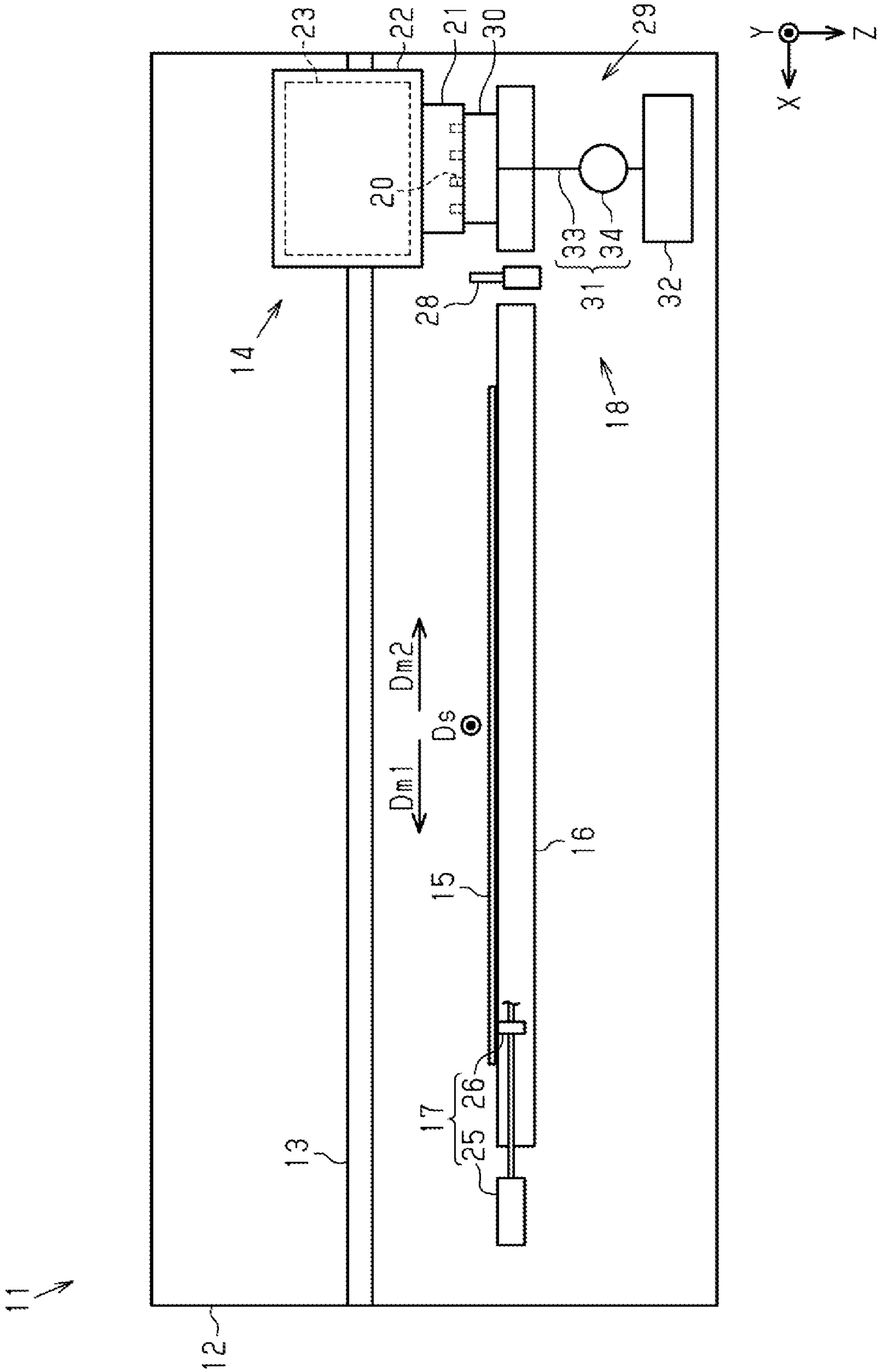
FIG. 1 is a schematic diagram of a liquid ejection device according to a first exemplary embodiment.

A liquid ejection device and a control method for a liquid ejection device according to a first exemplary embodiment are described below with reference to the drawings. The liquid ejection device is an ink-jet type printer that performs printing by ejecting an ink, which an example of a liquid, onto a medium such as paper, fabric, a vinyl article, a plastic component, and a metal component.

Liquid Ejection Device

In the drawings, the gravitational direction is indicated by a Z axis while assuming that a liquid ejection device 11 is placed on a horizontal plane, and directions along the horizontal plane are indicated by an X axis and a Y axis. The X axis, the Y axis, and the Z axis are orthogonal to one another. In the present exemplary embodiment, an increase in the viscosity of the liquid is also referred to as thickening.

As illustrated in FIG. 1, the liquid ejection device 11 includes a housing 12, a guide shaft 13, and a printing unit 14. The liquid ejection device 11 may include a medium support unit 16 that supports a medium 15, a transport unit 17, and a maintenance unit 18.

The guide shaft 13 may be supported by the housing 12.

The printing unit 14 may be provided movably along the guide shaft 13. The printing unit 14 includes a liquid ejection unit 21 having a plurality of nozzles 20. The printing unit 14 may include a carriage 22. The carriage 22 causes the liquid ejection unit 21 to reciprocates along the guide shaft 13. The liquid ejection unit 21 is movable in a first main scanning direction Dm1 and a second main scanning direction Dm2 opposite to the first main scanning direction Dm1. The first main scanning direction Dm1 and the second main scanning direction Dm2 in the present exemplary embodiment are parallel to the X-axis.

The carriage 22 may move in a state in which a liquid container 23 is mounted. The liquid container 23 supplies the contained liquid to the liquid ejection unit 21. The liquid ejection unit 21 performs printing by ejecting the liquid from the nozzle 20 onto the medium 15. The liquid ejection unit 21 performs printing by ejecting the liquid while moving in the first main scanning direction Dm1 or the second main scanning direction Dm2.

The medium support unit 16 is provided at a position facing the liquid ejection unit 21 that moves in the first main scanning direction Dm1 and the second main scanning direction Dm2. The medium support unit 16 supports a portion of the medium 15 on which printing is performed by the liquid ejection unit 21.

The transport unit 17 transports the medium 15 along a transport path (not illustrated). The transport path may be curved. The transport unit 17 transports a portion of the medium 15 supported by the medium support unit 16 in a sub-scanning direction Ds. The sub-scanning direction Ds in the present exemplary embodiment is parallel to the Y axis. That is, the sub-scanning direction Ds is a direction perpendicular to the first main scanning direction Dm1 and the second main scanning direction Dm2.

The transport unit 17 may include a drive source 25 and a roller 26. The drive source 25 is, for example, a motor that rotates the roller 26. The roller 26 is rotated to transport the medium 15. The roller 26 may be provided at a position different from the medium support unit 16 in the sub-scanning direction Ds. A plurality of rollers 26 may be provided with the medium support unit 16 interposed therebetween in the sub-scanning direction Ds.

The transport unit 17 transports the medium 15 at a timing at which the reciprocating liquid ejection unit 21 turns back. The length of the medium 15 transported by the transport unit 17 at one time is equal to the length of the medium 15 printed by the liquid ejection unit 21 in one movement. The liquid ejection device 11 is a serial type that performs printing on the medium 15 by alternately performing printing by the liquid ejection unit 21 and conveyance by the transport unit 17.

The maintenance unit 18 performs maintenance of the liquid ejection unit 21. The maintenance unit 18 may include a wiping unit 28 and a cleaning unit 29. The cleaning unit 29 may include a liquid reception unit 30, a suction mechanism 31, and a waste liquid storage unit 32. The suction mechanism 31 may include a discharge path 33 and a discharge pump 34.

The wiping unit 28 is provided to be movable between a wiping position at which the liquid ejection unit 21 can be wiped and a non-wiping position at which the wiping unit 28 does not come into contact with the liquid ejection unit 21. The wiping unit 28 located at the wiping position comes into contact with the moving liquid ejection unit 21 to wipe the liquid ejection unit 21. The maintenance in which the wiping unit 28 wipes the liquid ejection unit 21 is also referred to as wiping.

The discharge path 33 couples the liquid reception unit 30 and the waste liquid storage unit 32 to each other. The discharge path 33 has an upstream end coupled to the liquid reception unit 30, and a downstream end coupled to the waste liquid storage unit 32. The discharge path 33 may be configured by a tube that deforms in accordance with movement of the liquid reception unit 30.

The discharge pump 34 may be provided in the middle of the discharge path 33. The discharge pump 34 sends the liquid in the liquid reception unit 30 to the waste liquid storage unit 32.

The waste liquid storage unit 32 stores the liquid sent from the liquid reception unit 30 as waste liquid.

The liquid reception unit 30 receives the liquid discharged from the liquid ejection unit 21. The liquid reception unit 30 is provided so as to be movable between a capping position illustrated in FIG. 1 and a separated position (not illustrated). The liquid reception unit 30 located at the capping position is in contact with the liquid ejection unit 21. The liquid reception unit 30 located at the capping position forms a closed space surrounding the nozzles 20 between the liquid reception unit 30 and the liquid ejection unit 21.

The maintenance in which the liquid reception unit 30 forms a closed space with the liquid ejection unit 21 is also referred to as capping. The liquid reception unit 30 located at the capping position caps the liquid ejection unit 21 located at the home position. The liquid reception unit 30 opens the closed space by moving from the capping position to the separated position.

The suction mechanism 31 sucks the liquid to from the nozzle 20 via the liquid reception unit 30 that caps the liquid ejection unit 21. Specifically, the suction mechanism 31 drives the discharge pump 34 to reduce the pressure in the closed space and forcibly discharge the liquid from the nozzle 20. The discharged liquid is stored as waste liquid in the waste liquid storage unit 32 via the discharge path 33. The maintenance in which the liquid is forcibly discharged from the nozzle 20 by reducing the pressure in the closed space is also referred to as suction cleaning. The cleaning unit 29 can perform the suction cleaning, which is an example of cleaning in which the liquid is forcibly discharged from the nozzle 20 by an external force, as maintenance.

The suction mechanism 31 may drive the discharge pump 34 in a state in which the liquid reception unit 30 is located at the separated position to discharge the liquid in the liquid reception unit 30. The maintenance of forcibly discharging the liquid in the liquid reception unit 30 in a state in which the closed space is opened is also referred to as idle suction.

The maintenance in which the liquid is discharged from the nozzle 20 is also referred to as flushing. The maintenance includes the flushing in which the liquid is discharged from the liquid ejection unit 21 to the liquid reception unit 30. The liquid reception unit 30 can receive the liquid ejected by the liquid ejection unit 21. In the flushing in the present exemplary embodiment, the liquid ejection unit 21 located at the home position is caused to eject the liquid toward the liquid reception unit 30 located at the separated position.

Electrical Configuration

Figure 2:
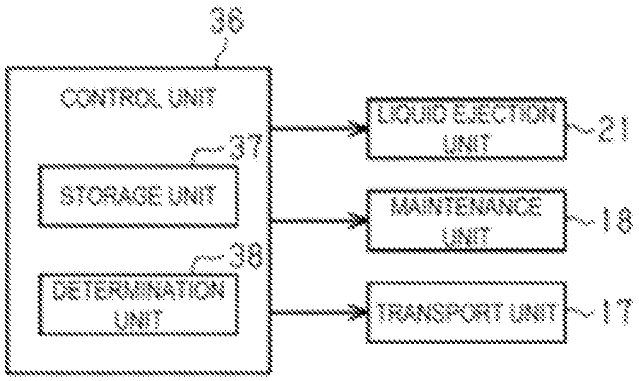
FIG. 2 is a block diagram of a control unit of the liquid ejection device.

As illustrated in FIG. 2, the liquid ejection device 11 includes a control unit 36. The control unit 36 controls various components of the liquid ejection device 11 such as the liquid ejection unit 21, the transport unit 17, and the maintenance unit 18.

The control unit 36 may be configured as a circuit including a: one or more processors that perform various processes according to a computer program, one or more dedicated hardware circuits that perform at least some of the various processes, or y: a combination thereof. The hardware circuit is, for example, an application-specific integrated circuit. The processor includes a CPU and a memory such as RAM and ROM, and the memory stores a program code or a command configured to cause the CPU to perform the process. The memory, that is, a computer readable medium includes all kinds of readable media accessible by a general purpose or dedicated computer.

The control unit 36 includes a storage unit 37. The storage unit 37 is, for example, a memory such as a RAM and a ROM described above. The storage unit 37 stores various programs and various parameters. The control unit 36 may function as a determination unit 38 by executing a program stored in the storage unit 37. Thus, it can be said that the liquid ejection device 11 includes the determination unit 38.

The determination unit 38 determines whether printing data for printing is ruled-line data including a vertical ruled line or non-ruled-line data not including a vertical ruled line. Here, a case in which a vertical ruled line is included in the printing data for printing is also referred to as a ruled-line mode, and a case in which a vertical ruled line is not included in the printing data for printing is also referred to as a non-ruled-line mode. That is, the determination unit 38 determines whether the printing mode is the ruled-line mode or the non-ruled-line mode. The non-ruled-line data may include document data including characters and photograph data not including characters. The determination unit 38 may determine whether the printing data for printing is document data or photograph data. Here, a case in which the printing data for printing is document data is also referred to as a document mode, and a case in which the printing data for printing is photograph data is also referred to as a photograph mode. That is, the determination unit 38 may determine whether the printing mode is the document mode or the photograph mode.

The vertical ruled line is a ruled line extending in the sub-scanning direction Ds. The vertical ruled line is a ruled line non-parallel to the first main scanning direction Dm1, and includes a ruled line that is parallel to the sub-scanning direction Ds and a ruled line that is inclined with respect to the first main scanning direction Dm1 and the sub-scanning direction Ds. The length of the vertical ruled line in the sub-scanning direction Ds is longer than the length by which the liquid ejection unit 21 can perform printing by one movement. The liquid ejection unit 21 moves one or more times in each of the first main scanning direction Dm1 and the second main scanning direction Dm2 to print a vertical ruled line. The transport unit 17 transports the medium 15 one or more times while the vertical ruled line is printed.

The characters include hiragana characters, katakana characters, kanji characters, symbols, Latin characters, Greek characters, Cyrillic characters, and Arabic characters. The determination unit 38 may determine that the mode is the document mode when a character code is included in the printing data, and may determine that the mode is the photograph mode when a character code is not included in the printing data. That is, when the printing data includes a character and a photograph, the determination unit 38 may determine that the mode is the document mode.

The storage unit 37 stores a determination result obtained by the determination unit 38. The storage unit 37 may store, as the determination result, the number of media 15 on which printing is performed in the ruled-line mode and the number of media 15 on which printing is performed in the non-ruled-line mode. The storage unit 37 may store, as the determination result, the number of media 15 on which printing is performed in the non-ruled-line mode and the document mode and the number of media 15 on which printing is performed in the non-ruled-line mode and the photograph mode.

Next, a control method for the liquid ejection device 11 is described with reference to the flowcharts illustrated in FIG. 3 and FIG. 4.

Figure 3:
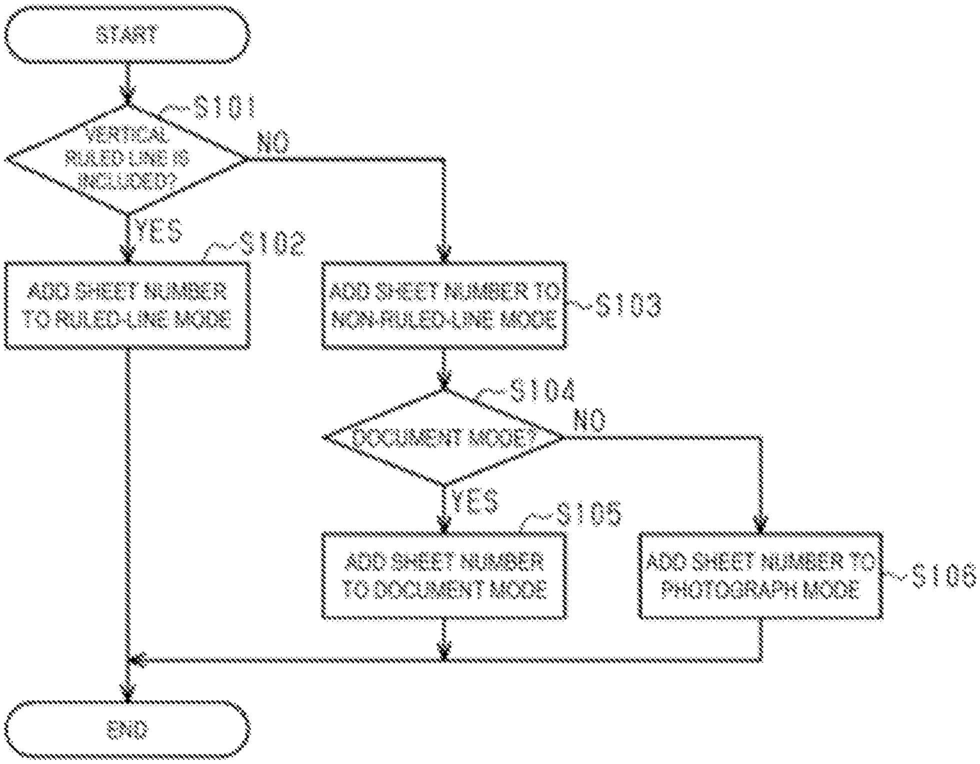
FIG. 3 is a flowchart illustrating a determination routine.

A determination routine illustrated in FIG. 3 is executed at a timing at which printing is executed.

In Step S101, the control unit 36 causes the determination unit 38 to determine whether a vertical ruled line is included in the executed printing. When a vertical ruled line is included, which is determined as Yes in Step S101, the control unit 36 proceeds the processing to Step S102. In Step S102, the control unit 36 adds the number of sheets printed this time to the number of sheets printed in the ruled-line mode stored in the storage unit 37, and ends the processing.

When a vertical ruled line is not included in the printing executed this time in Step S101, which is determined as NO in Step S101, cutting size is not acquired, the control unit 36 proceeds the processing to Step S103. In Step S103, the control unit 36 adds the number of sheets printed this time to the number of sheets printed in the non-ruled-line mode stored in the storage unit 37.

In Step S104, the control unit 36 causes the determination unit 38 to determine whether the executed printing is in the document mode. In a case of the document mode, which is determined as Yes in Step S104, and the control unit 36 proceeds the processing to Step S105. In Step S105, the control unit 36 adds the number of sheets printed this time to the number of sheets printed in the document mode stored in the storage unit 37, and ends the processing.

In Step S104, when the executed printing is not in the document mode, which is determined as NO in Step S104, the control unit 36 proceeds the processing to Step S106. In Step S106, the control unit 36 adds the number of sheets printed this time to the number of sheets printed in the photograph mode stored in the storage unit 37, and ends the processing.

Figure 4:
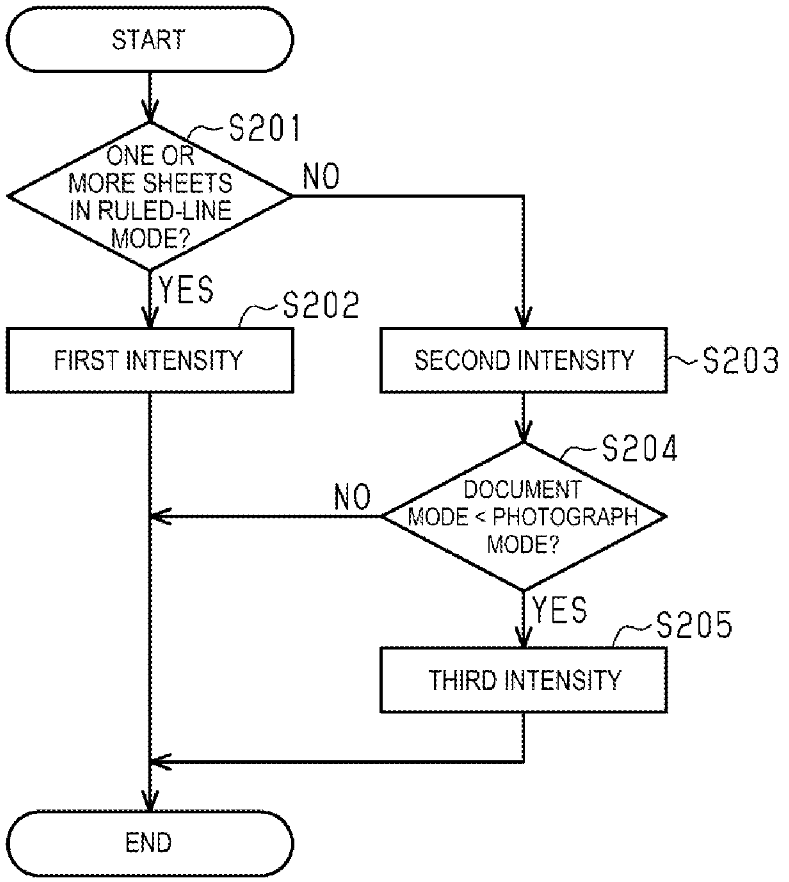
FIG. 4 is a flowchart illustrating a setting routine.

A setting routine illustrated in FIG. 4 is executed at a timing at which the number of printed sheets stored in the storage unit 37 exceeds a set threshold value. That is, the setting routine is executed at a timing at which the total number of sheets in the ruled-line mode and the non-ruled-line mode exceeds the set threshold value. The set threshold value is stored in the storage unit 37 in advance. The set threshold value may be, for example, half the number of sheets that can be printed by the liquid ejection device 11.

In Step S201, the control unit 36 determines whether the number of media 15 on which printing is performed in the ruled-line mode is one or more. When even one sheet is subjected to the printing in the ruled-line mode, which is determined as YES in Step S201, the control unit 36 proceeds the processing to Step S202. In Step S202, the control unit 36 sets intensity of the maintenance to first intensity, and ends the processing.

When there is no medium 15 on which printing is performed in the ruled-line mode, which is determined as NO in Step S201, the control unit 36 proceeds the processing to Step S203. In Step S203, the control unit 36 sets the intensity of the maintenance to second intensity.

In Step S204, the control unit 36 compares the number of media 15 subjected to the printing in the document mode with the number of media 15 subjected to the printing in the photograph mode. When the number of media 15 subjected to the printing in the photograph mode is greater than the number of media 15 subjected to the printing in the document mode, which is YES in Step S204, the control unit 36 proceeds the processing to Step S205. In Step S205, the control unit 36 changes the setting of the intensity for the intensity from the second intensity to third intensity, and ends the processing.

When the number of media 15 subjected to the printing in the document mode is greater than the number of media 15 subjected to the printing in the photograph mode, which is NO in Step S204, the control unit 36 ends the processing while maintaining the intensity of the maintenance as the second intensity.

Actions of First Exemplary Embodiment

Actions of the present exemplary embodiment are described.

The control unit 36 changes the intensity of the maintenance in accordance with the frequency of the ruled-line mode included in the determination result stored in the storage unit 37.

When the ruled-line mode is included in the determination result, the control unit 36 may perform the maintenance with the first intensity. The first intensity may be the same as the intensity of the maintenance before the control unit 36 executes the setting routine.

When the ruled-line mode is not included in the determination result, the control unit 36 may perform the maintenance with the second intensity that is lower than the first intensity. When the frequency of the photograph mode included is higher than the frequency of the document mode in the determination result, the control unit 36 may change the intensity of the maintenance performed with the second intensity to the third intensity that is lower than the second intensity.

The control unit 36 may change the type of the maintenance of the liquid ejection unit 21 in accordance with the timing at which the maintenance is performed. For example, the control unit 36 may perform the flushing as the maintenance performed before printing. The control unit 36 may perform the suction cleaning as the maintenance that is periodically performed.

The control unit 36 may change the intensity of the maintenance by changing the ejection amount in flushing performed once. For example, as the flushing with the first intensity, the control unit 36 may perform setting so that liquid droplets are ejected by the first droplet number from each of the nozzles 20. As the flushing with the second intensity, the control unit 36 may perform setting so that liquid droplets are ejected by the second droplet number, which is less than the first droplet number, from each of the nozzles 20. As the flushing with the third intensity, the control unit 36 may perform setting so that liquid droplets are ejected by the third droplet number, which is less than the second droplet number, from each of the nozzles 20.

The control unit 36 may change the intensity of the maintenance by changing the frequency of the cleaning. For example, as the maintenance with the first intensity, the control unit 36 may execute the suction cleaning at a timing at which the printing is performed on the first specified number of sheets of the medium 15. As the maintenance with the second intensity, the control unit 36 may execute the suction cleaning at a timing at which the printing is performed on the second specified number, which is greater than the first specified number, of sheets of the medium 15. As the maintenance with the third intensity, the control unit 36 may execute the suction cleaning at a timing at which the printing is performed on the third specified number, which is greater than the second specified number, of sheets of the medium 15.

Effects of First Exemplary Embodiment

Effects of the present exemplary embodiment are described.

(1) The control unit 36 changes the intensity of the maintenance in accordance with the frequency of the ruled-line mode. In the ruled-line mode including a vertical ruled line, higher ejection accuracy is required compared to the non-ruled-line mode not including a vertical ruled line. Therefore, the liquid to be consumed can efficiently be reduced by performing the maintenance as required.

(2) When the ruled-line mode is not included in the determination result, the control unit 36 performs the maintenance with the second intensity that is lower than the first intensity. Therefore, the liquid that is wastefully consumed can be reduced.

(3) When the frequency of the photograph mode is higher than the frequency of the document mode in the non-ruled-line mode included in the determination result, the control unit 36 performs the maintenance with the third intensity that is lower than the second intensity. When a photograph is printed, the amount of liquid used for printing is larger than that in a case in which a document is printed, and the viscosity of the liquid in the liquid ejection unit 21 is less likely to be increased. Therefore, the liquid that is wastefully consumed can be reduced by performing the maintenance with the third intensity.

(4) The liquid ejection unit 21 discharges the liquid having increased viscosity by performing the flushing. The control unit 36 changes the intensity of the maintenance by changing the ejection amount in flushing performed once. Therefore, the intensity of the maintenance can easily be changed.

(5) The cleaning unit 29 discharges foreign substances such as the liquid having increased viscosity and air bubbles in the liquid ejection unit 21 by performing the cleaning. The control unit 36 changes the intensity of the maintenance by changing the frequency of the suction cleaning. Therefore, the intensity of the maintenance can easily be changed.

Second Exemplary Embodiment

Next, a liquid ejection device according to a second exemplary embodiment is described below with reference to the drawings. Note that the second exemplary embodiment is different from the first exemplary embodiment in the setting routine. Further, since other points are substantially the same as those of the first exemplary embodiment, duplicate descriptions of the same configuration are omitted while assigning the same reference signs to the same components.

Figure 5:
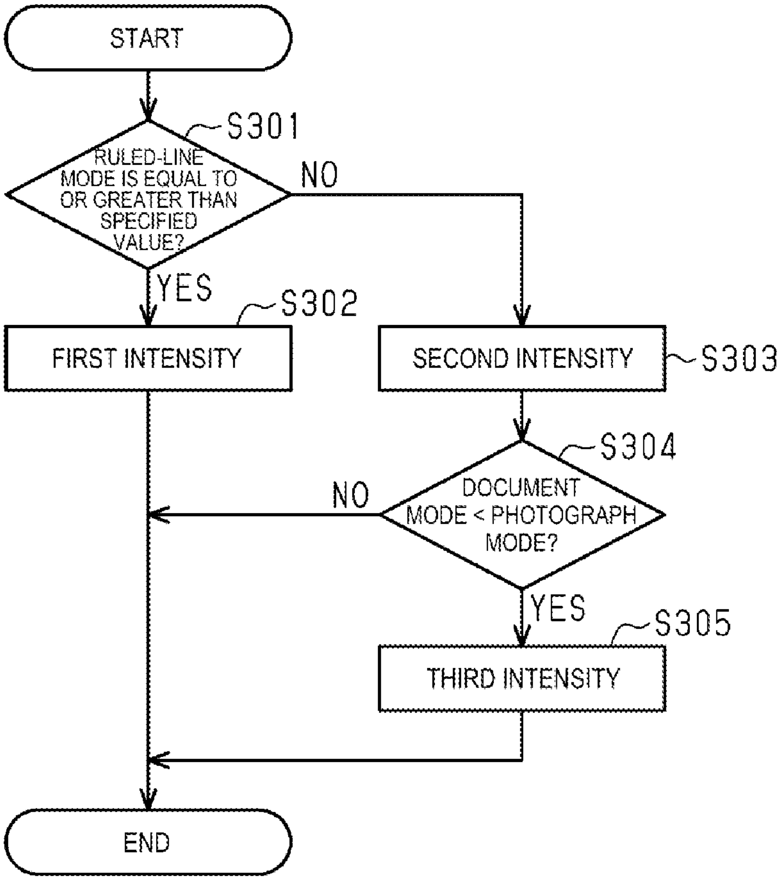
FIG. 5 is a flowchart illustrating a setting routine in a second exemplary embodiment.

The timing at which the setting routine illustrated in FIG. 5 is executed is the same as the timing at which the setting routine illustrated in FIG. 4 is executed.

In Step S301, the control unit 36 determines whether the frequency of the ruled-line mode is equal to or greater than a specified value. When the frequency of the ruled-line mode is equal to or greater than the specified value, which is determined as YES in Step S301, the control unit 36 proceeds the processing to Step S302. In Step S302, the control unit 36 sets the intensity of the maintenance to the first intensity, and ends the processing.

When the frequency of the ruled-line mode is lower than the specified value, which is determined as NO in Step S301, the control unit 36 proceeds the processing to Step S303. In Step S303, the control unit 36 sets the intensity of the maintenance to the second intensity.

In Step S304, the control unit 36 compares the number of media 15 subjected to the printing in the document mode with the number of media 15 subjected to the printing in the photograph mode. When the number of media 15 subjected to the printing in the photograph mode is greater than the number of media 15 subjected to the printing in the document mode, which is YES in Step S304, the control unit 36 proceeds the processing to Step S305. In Step S305, the control unit 36 changes the setting of the intensity of the maintenance from the second intensity to the third intensity, and ends the processing.

When the number of media 15 subjected to the printing in the document mode is greater than the number of media 15 subjected to the printing in the photograph mode, which is NO in Step S304, the control unit 36 ends the processing while maintaining the intensity of the maintenance as the second intensity.

Actions of Second Exemplary Embodiment

Actions of the present exemplary embodiment are described.

When the frequency of the ruled-line mode included in the determination result is equal to or greater than the specified value, the control unit 36 may perform the maintenance with the first intensity. The specified value may be a value stored in advance in the storage unit 37, or may be set by a user. The specified value may be, for example, 30%.

When the frequency of the ruled-line mode included in the determination result is lower than the specified value, the control unit 36 may perform the maintenance with the second intensity that is lower than the first intensity. When the frequency of the photograph mode included is higher than the frequency of the document mode in the determination result, the control unit 36 may change the intensity of the maintenance performed with the second intensity to the third intensity that is lower than the second intensity.

The control unit 36 may set the intensity of the maintenance based on the frequency of the ruled-line mode from the start of use of the liquid ejection device 11 to the present time. The control unit 36 may set the intensity of the maintenance based on the frequency of the ruled-line mode from the present time to the specified number of sheets. The control unit 36 may set the intensity of the maintenance based on the frequency of the ruled-line mode in the printing performed before a designated period. The designated period may be, for example, the same period one year ago, the same month one year ago, or the same season one year ago. The designated period may be, for example, the same period from one year ago to several years ago, the same month from one year ago to several years ago, or the same season from one year ago to several years ago.

Effects of Second Exemplary Embodiment

Effects of the present exemplary embodiment are described.

(6) When the frequency of the ruled-line mode included in the determination result is lower than the specified value, the control unit 36 performs the maintenance with the second intensity that is lower than the first intensity. Therefore, the liquid that is wastefully consumed can be reduced.

Modified Examples

The exemplary embodiments described above may be modified as follows. The exemplary embodiments and modified examples thereof to be described below may be implemented in combination within a range in which a technical contradiction does not arise.

The set threshold may be a threshold related to time. The control unit 36 may execute the setting routine when the time from the start of the use of the liquid ejection device 11 to the present time exceeds the set threshold value.

When a printing duty is less than a density threshold value, the determination unit 38 may determine that the mode is the document mode. When the printing duty is equal to or greater than the density threshold value, the determination unit 38 may determine that the mode is the photograph mode. The density threshold value may be stored in the storage unit 37 in advance, or may be set by a user. The printing duty is a ratio of the number of dots of the liquid that is actually driven into the medium 15 to the maximum number of dots of the liquid that can be driven thereinto.

When the amount of the liquid that is ejected onto the medium 15 and is consumed is less than a consumption threshold value, the determination unit 38 may determine that the mode is the document mode. When the amount of the liquid that is ejected onto the medium 15 and is consumed is equal to or greater than the consumption threshold value, the determination unit 38 may determine that the mode is the photograph mode. The consumption threshold value may be stored in the storage unit 37 in advance, or may be set by a user.

When a printing speed is higher than a speed threshold value, the determination unit 38 may determine that the mode is the document mode. When the printing speed is equal to or lower than the speed threshold value, the determination unit 38 may determine that the mode is the photograph mode. The speed threshold value may be stored in the storage unit 37 in advance, or may be set by a user.

The determination unit 38 may determine the document mode and the photograph mode based on an extension of an original file from which the printing data is generated. For example, the determination unit 38 may determine that the mode is the photograph mode when the original file has an extension suitable for a photograph.

The determination unit 38 may determine the document mode and the photograph mode based on a size of an original file from which the printing data is generated. For example, the determination unit 38 may determine that the mode is the photograph mode when the data size per sheet of medium 15 or the data size per unit area of one sheet of medium 15 is larger than a size threshold value.

The determination unit 38 may determine the document mode and the photograph mode by combining the plurality of methods described above. By combining the plurality of methods, determination accuracy can be improved.

The maintenance unit 18 may perform pressurization cleaning as the cleaning in which the liquid is forcibly discharged from the nozzle 20 by an external force. The liquid reception unit 30 may receive the liquid discharged by the pressurization cleaning. The maintenance unit 18 may include a pressurizing mechanism that pressurizes the liquid in the liquid ejection unit 21. The maintenance unit 18 may forcibly discharge the liquid from the nozzle 20 by pressurizing the liquid in the liquid ejection unit 21 using the pressurizing mechanism.

The maintenance unit 18 may separately include the liquid reception unit 30 that receives the liquid discharged through the flushing and the liquid reception unit 30 that receives the liquid discharged by the cleaning. The maintenance unit 18 may include a cap that performs capping. The maintenance unit 18 may include the liquid reception unit 30 that receives the liquid discharged by the flushing, and the cap that performs the capping and the suction cleaning.

The control unit 36 may change the intensity of the suction cleaning and the pressurization cleaning by changing the amount of the liquid discharged from the nozzle 20. The amount of liquid to be discharged in the maintenance with the second intensity may be smaller than that in the maintenance with the first intensity. The amount of liquid to be discharged in the maintenance with the third intensity may be smaller than that in the maintenance with the second intensity. For example, the control unit 36 may reduce the amount of liquid to be discharged by shortening the time for executing the cleaning.

The control unit 36 may change the intensity of the suction cleaning and the pressurization cleaning by changing the flow rate of the liquid passing through the nozzle 20. The maintenance with the second intensity may have a lower flow rate than the maintenance with the first intensity. The maintenance with the third intensity may have a lower flow rate than the maintenance with the second intensity.

The maintenance unit 18 may perform choke cleaning as the cleaning in which the liquid is forcibly discharged from the nozzle 20 by an external force. The choke cleaning is cleaning in which the discharge pump 34 is driven in a state in which the flow of the liquid supplied to the nozzle 20 is restricted to increase a negative pressure, and then the restricted flow of the liquid is released to discharge the liquid vigorously. In the choke cleaning, the maintenance can be performed with intensity stronger than that for the suction cleaning, the pressurization cleaning, and the flushing.

The control unit 36 may change the type of the maintenance in accordance with the intensity. The control unit 36 may execute the choke cleaning as the maintenance with the first intensity, execute the suction cleaning as the maintenance with the second intensity, and execute the flushing as the maintenance with the third intensity.

The control unit 36 may perform the maintenance with the second intensity regardless of the frequency of the photograph mode when the frequency of the ruled-line mode is lower than the specified value or when the ruled-line mode is not included in the determination result.

The liquid ejection device 11 may be a liquid ejection device that jets or ejects a liquid other than ink. The state of the liquid ejected from the liquid ejection device in the form of a minute amount of liquid droplets includes a granular shape, a teardrop shape, and a stringy shape. The liquid described herein may be any material that can be ejected from the liquid ejection device. For example, the liquid may be any substance as long as the substance is in a liquid phase, and it is assumed that the liquid includes a fluid body such as a liquid body with high or low viscosity, sol, gel water, other inorganic solvents, an organic solvent, a solution, a liquid resin, liquid metal, and metallic melt. The liquid includes not only a liquid as one state of a substance but also a substance in which particles of a functional material composed of a solid material such as a pigment or metal particles are dissolved, dispersed, or mixed in a solvent. Typical examples of the liquid include ink and liquid crystal as described in the exemplary embodiments given above. Here, it is assumed that the ink includes various types of liquid compositions such as a general water-based ink and oil-based ink, a gel ink, and a hot-melt ink. Specific examples of the liquid ejection device include a device that ejects a liquid being a material such as an electrode material and a color material in a dispersed or dissolved form. Such material is used for manufacturing a liquid crystal displays, an electroluminescent display, a surface emitting display, and a color filter, for example. The liquid ejection device may be a device that ejects bioorganic substances used for biochip manufacturing, a device that ejects a liquid that is used as a precision pipette and a sample, a printing device, a micro dispenser, or the like. The liquid ejection device may be a device that ejects lubricant to a precision machine such as a clock or a camera in a pinpoint manner and a device that ejects a transparent resin liquid such as an ultraviolet cure resin onto a substrate for the purpose of forming a tiny hemispherical lens, an optical lens, or the like used for an optical communication element or the like. The liquid ejection device may be a device that ejects an etching liquid such as acid or alkali for subjecting a substrate or the like to etching.

Supplementary Notes

Hereinafter, technical concepts and effects thereof that are understood from the above-described exemplary embodiments and modified examples are described.

(A) A liquid ejection device includes a liquid ejection unit configured to perform printing by ejecting a liquid from a nozzle onto a medium, a maintenance unit configured to perform maintenance of the liquid ejection unit, a determination unit configured to determine whether a printing mode for the printing is a ruled-line mode including a vertical ruled line or a non-ruled-line mode not including the vertical ruled line, a storage unit configured to store a determination result obtained by the determination unit, and a control unit, and the control unit changes intensity of the maintenance in accordance with a frequency of the ruled-line mode included in the determination result stored in the storage unit.

According to this configuration, the control unit changes the intensity of the maintenance in accordance with the frequency of the ruled-line mode. In the ruled-line mode including a vertical ruled line, higher ejection accuracy is required compared to the non-ruled-line mode not including a vertical ruled line. Therefore, the liquid to be consumed can efficiently be reduced by performing the maintenance as required.

(B) In the liquid ejection device, the control unit may perform the maintenance with first intensity when the ruled-line mode is included in the determination result stored in the storage unit, and may perform the maintenance with second intensity when the ruled-line mode is not included in the determination result stored in the storage unit, the second intensity being lower than the first intensity.

According to this configuration, when the ruled-line mode is not included in the determination result, the control unit performs the maintenance with the second intensity that is lower than the first intensity. Therefore, the liquid that is wastefully consumed can be reduced.

(C) In the liquid ejection device, the control unit may perform the maintenance with first intensity when a frequency of the ruled-line mode included in the determination result stored in the storage unit is equal to or greater than a specified value, and may perform the maintenance with second intensity when a frequency of the ruled-line mode included in the determination result stored in the storage unit is lower than the specified value, the second intensity being lower than the first intensity.

According to this configuration, when the frequency of the ruled-line mode included in the determination result is lower than the specified value, the control unit performs the maintenance with the second intensity that is lower than the first intensity. Therefore, the liquid that is wastefully consumed can be reduced.

(D) In the liquid ejection device, the non-ruled-line mode may include a document mode for printing document data and a photograph mode for printing photograph data, and the control unit may change intensity of the maintenance performed with the second intensity to third intensity when a frequency of the photograph data is higher than a frequency of the document data included in the determination result, the third intensity being lower than the second intensity.

According to this configuration, when the frequency of the photograph mode is higher than the frequency of the document mode in the non-ruled-line mode included in the determination result, the control unit performs the maintenance with the third intensity that is lower than the second intensity. When a photograph is printed, the amount of liquid used for printing is larger than that in a case in which a document is printed, and the viscosity of the liquid in the liquid ejection unit is less likely to be increased. Therefore, the liquid that is wastefully consumed can be reduced by performing the maintenance with the third intensity.

(E) In the liquid ejection device, the maintenance unit may include a liquid reception unit configured to receive the liquid ejected by the liquid ejection unit, the maintenance may include flushing in which the liquid is ejected from the liquid ejection unit to the liquid reception unit, and the control unit may change intensity of the maintenance by changing an ejection amount in flushing performed once.

According to this configuration, the liquid ejection unit discharges the liquid having increased viscosity by performing the flushing. The control unit changes the intensity of the maintenance by changing the ejection amount in flushing performed once. Therefore, the intensity of the maintenance can easily be changed.

(F) In the liquid ejection device, the maintenance unit may include a cleaning unit configured to perform, as the maintenance, cleaning in which the liquid is forcibly discharged from the nozzle by an external force, and the control unit may change intensity of the maintenance by changing a frequency of the cleaning.

According to this configuration, the cleaning unit discharges foreign substances such as the liquid having increased viscosity and air bubbles in the liquid ejection unit by performing the cleaning. The control unit changes the intensity of the maintenance by changing the frequency of the cleaning. Therefore, the intensity of the maintenance can easily be changed.

(G) A control method for a liquid ejection device including a liquid ejection unit configured to perform printing by ejecting a liquid from a nozzle onto a medium, a maintenance unit configured to perform maintenance of the liquid ejection unit, a determination unit configured to determine whether a printing mode for the printing is a ruled-line mode including a vertical ruled line or a non-ruled-line mode not including the vertical ruled line, and a storage unit configured to store a determination result obtained by the determination unit, wherein intensity of the maintenance is changed in accordance with a frequency of the ruled-line mode included in the determination result stored in the storage unit.

According to this method, the same effects as the liquid ejection device described above can be exerted.

What is claimed is:

1. A liquid ejection device, comprising:
- a liquid ejection unit configured to perform printing by ejecting a liquid from a nozzle onto a medium;
- a maintenance unit configured to perform maintenance of the liquid ejection unit;
- a determination unit configured to determine whether printing data for the printing is ruled-line data including a vertical ruled line or non-ruled-line data not including the vertical ruled line;
- a storage unit configured to store a determination result obtained by the determination unit; and
- a control unit, wherein
- the control unit changes intensity of the maintenance in accordance with a frequency of the ruled-line data included in the determination result stored in the storage unit,
- the control unit performs:
- the maintenance with first intensity when the ruled-line data is included in the determination result stored in the storage unit; and
- the maintenance with second intensity when the ruled-line data is not included in the determination result stored in the storage unit, the second intensity being lower than the first intensity,
- the non-ruled-line data comprises document data including characters and photograph data not including characters, and
- the control unit changes intensity of the maintenance performed with the second intensity to a third intensity when, in the non-ruled-line data included in the determination result, a frequency of the photograph data is higher than a frequency of the characters included in the document data, the third intensity being lower than the second intensity.

2. The liquid ejection device according to claim 1, wherein
- the maintenance unit includes a liquid reception unit configured to receive the liquid ejected by the liquid ejection unit,
- the maintenance includes flushing in which the liquid is ejected from the liquid ejection unit to the liquid reception unit, and
- the control unit changes intensity of the maintenance by changing an ejection amount in flushing performed once.

3. The liquid ejection device according to claim 1, wherein
- the maintenance unit includes a cleaning unit configured to perform, as the maintenance, cleaning in which the liquid is forcibly discharged from the nozzle by an external force, and
- the control unit changes intensity of the maintenance by changing a frequency of the cleaning.

4. A liquid ejection device, comprising:
- a liquid ejection unit configured to perform printing by ejecting a liquid from a nozzle onto a medium;
- a maintenance unit configured to perform maintenance of the liquid ejection unit;
- a determination unit configured to determine whether printing data for the printing is ruled-line data including a vertical ruled line or non-ruled-line data not including the vertical ruled line;
- a storage unit configured to store a determination result obtained by the determination unit; and
- a control unit, wherein
- the control unit changes intensity of the maintenance in accordance with a frequency of the ruled-line data included in the determination result stored in the storage unit,
- the control unit performs:
- the maintenance with first intensity when a frequency of the ruled-line data included in the determination result stored in the storage unit is equal to or greater than a specified value; and
- the maintenance with second intensity when a frequency of the ruled-line data included in the determination result stored in the storage unit is lower than the specified value, the second intensity being lower than the first intensity, the non-ruled-line data comprises document data including characters and photograph data not including characters, and the control unit changes intensity of the maintenance performed with the second intensity to a third intensity when, in the non-ruled-line data included in the determination result, a frequency of the photograph data is higher than a frequency of the characters included in the document data, the third intensity being lower than the second intensity.

5. A control method for a liquid ejection device including a liquid ejection unit configured to perform printing by ejecting a liquid from a nozzle onto a medium, a maintenance unit configured to perform maintenance of the liquid ejection unit, a determination unit configured to determine whether printing data for the printing is ruled-line data including a vertical ruled line or non-ruled-line data not including the vertical ruled line, and a storage unit configured to store a determination result obtained by the determination unit, the control method comprising:

changing intensity of the maintenance in accordance with a frequency of the ruled-line data included in the determination result stored in the storage unit, performing the maintenance with first intensity when the ruled-line data is included in the determination result stored in the storage unit, performing the maintenance with second intensity when the ruled-line data is not included in the determination result stored in the storage unit, the second intensity being lower than the first intensity, wherein the non-ruled-line data comprises document data including characters and photograph data not including characters, and changing intensity of the maintenance performed with the second intensity to a third intensity when, in the non-ruled-line data included in the determination result, a frequency of the photograph data is higher than a frequency of the characters included in the document data, the third intensity being lower than the second intensity.

* * * * *